Aug. 11, 1925.

F. BALDOSSARRE 1,549,125

SPEED REGULATOR FOR AUTOMOBILES

Filed May 26, 1923    2 Sheets-Sheet 1

F. Baldossarre
INVENTOR

BY Victor J. Evans
ATTORNEY

WITNESS:

Aug. 11, 1925.
F. BALDOSSARRE
1,549,125
SPEED REGULATOR FOR AUTOMOBILES
Filed May 26, 1923   2 Sheets-Sheet 2
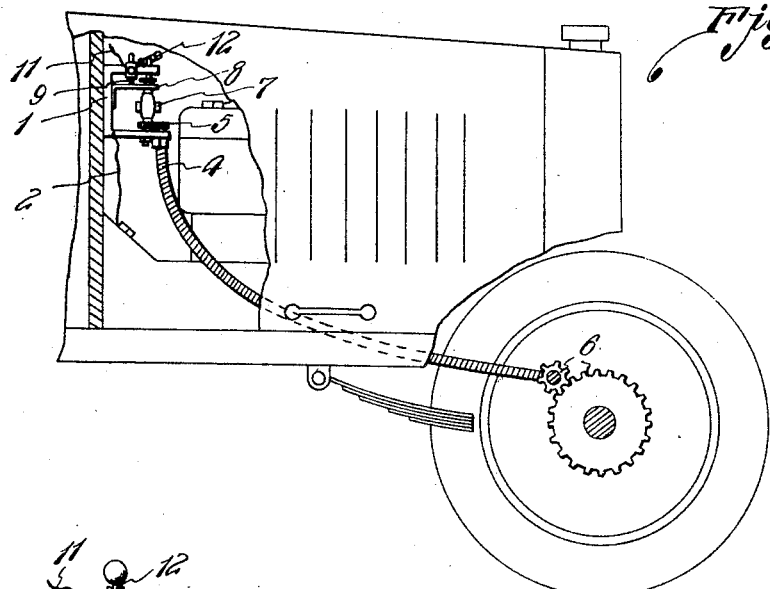
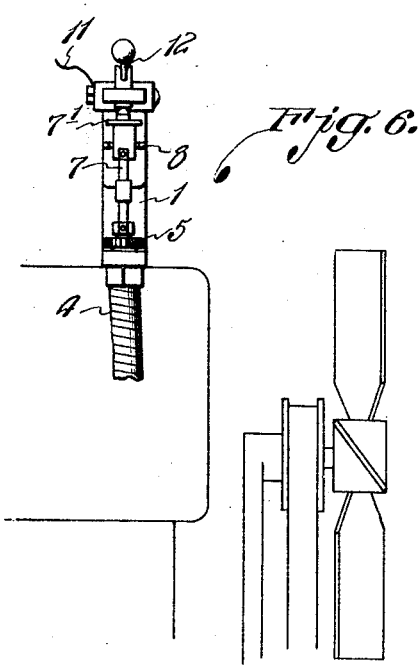
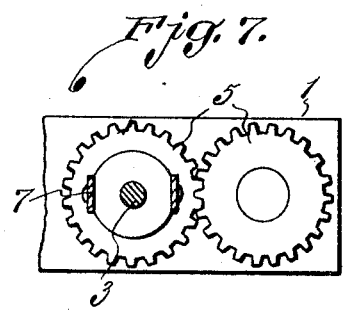
F. Baldossarre
INVENTOR
BY Victor J. Evans
ATTORNEY.

Patented Aug. 11, 1925.  1,549,125

UNITED STATES PATENT OFFICE.

FEDERICO BALDOSSARRE, OF NEWARK, NEW JERSEY.

SPEED REGULATOR FOR AUTOMOBILES.

Application filed May 26, 1923. Serial No. 641,795.

*To all whom it may concern:*

Be it known that I, FEDERICO BALDOSSARRE, a subject of the King of Italy, residing at Newark, in the county of Essex and State of New Jersey, have invented new and useful Improvements in Speed Regulators for Automobiles, of which the following is a specification.

This invention relates to improvements in motor vehicles, the general object of the invention being to provide a speed regulator for preventing the vehicle from exceeding a certain speed.

Another object of the invention is to render the device inactive whenever desired.

This invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:—

Figures 5 and 6 are views showing the device in use upon a motor vehicle.

Figure 7 is a sectional view taken on line 7—7 of Figure 1.

Figure 1:
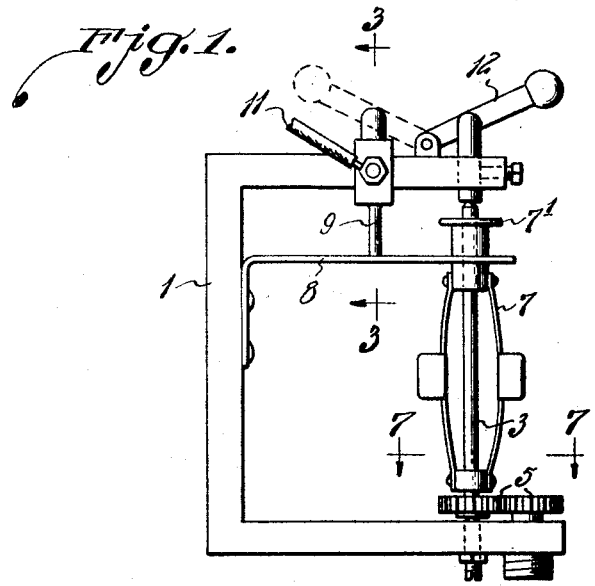
Figure 1 is a side view of the device.
Figure 2:
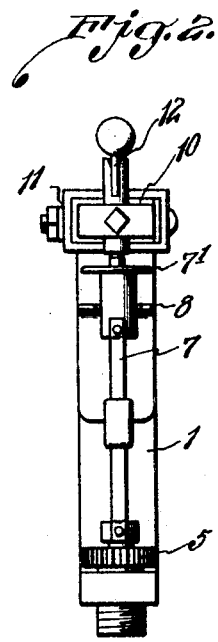
Figure 2 is an edge view thereof.
Figure 4:
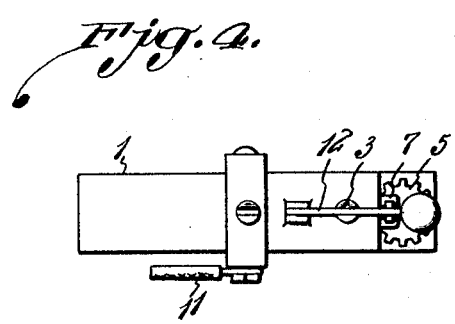
Figure 4 is a top plan view.
Figure 3:
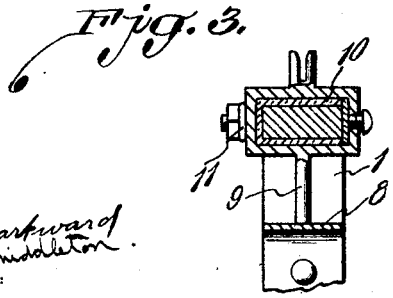
Figure 3 is a section on line 3—3 of Figure 1.

In these views 1 indicates a yoke-shaped frame which is attached to any suitable part of a motor vehicle and is grounded upon a part of the vehicle by the conductor 2. A shaft 3 is journaled in said frame and said shaft is connected with a flexible shaft 4 by the gears 5, said flexible shaft 4 being connected with one of the front wheels by the gears 6. A governor 7 is carried by the shaft 3 and a flat spring arm 8 is fastened to the frame 1 and has its forked end embracing the top part of the governor so that when the speed of the vehicle reaches a point where the collar 7' of the governor is lowered sufficiently to engage the arm, said arm will be lowered out of engagement with the contact 9 which is carried by the frame and which is insulated therefrom by the insulation 10. This contact 9 is connected with the magneto or other source by means of the conductor 11.

From the foregoing it will be seen that when the speed of the vehicle reaches a certain point the governor will act to lower the arm 8 and thus break the ignition circuit so that the motor will cease to function and thus check the speed of the vehicle. As soon as the speed is reduced to permit the governor to move out of engagement with the arm 8, said arm will return to its normal position and engage the contact 9 again, thus completing the ignition circuit and causing the motor to again function. In this manner the speed of the vehicle will be held down to a certain point.

When it is desired to render the device inactive a lever 12 is swung over against the top of the contact 9 so as to short circuit the device by connecting the contact 9 with the frame so that the current will not be broken when the arm 8 is moved out of engagement with the contact 9.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:—

In a device of the character described comprising a frame, a resilient arm carried thereby, a contact carried by the frame and normally engaging the resilient arm to complete an electrical circuit therethrough, a pivot shaft supported in the same and a centrifugally operated governor on the shaft and including a slidable sleeve having engagement with the resilient arm, the sleeve being moved in a direction to disengage the resilient arm from the contact to break the electrical circuit from over-speeding of the shaft, a bifurcated element carried by the contact and a pivoted hook blade carried by the frame and adapted to engage the bifurcated element to normally complete a circuit therethrough and being adapted to be disengaged from the bifurcated element to break the circuit when desired.

In testimony whereof I affix my signature.

FEDERICO BALDOSSARRE.